(12) United States Patent
Wiedemann et al.

(10) Patent No.: US 11,037,588 B1
(45) Date of Patent: Jun. 15, 2021

(54) INCREASING TAPE DRIVE HEAD PERFORMANCE WITH SECTIONAL CLEANING USING A CARTRIDGE MEMORY

(71) Applicant: International Business Machines Corporation, Armonk, NY (US)

(72) Inventors: Stefan Wiedemann, Kaiserslautern (DE); Markus Schäfer, Heiligenmoschel (DE); Erik Rueger, Ockenheim (DE); Robert Beiderbeck, Wassenberg (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/865,752

(22) Filed: May 4, 2020

(51) Int. Cl.
| | |
|---|---|
| *G11B 5/41* | (2006.01) |
| *G11B 15/02* | (2006.01) |
| *G11B 15/60* | (2006.01) |
| *G11B 23/04* | (2006.01) |
| *G11B 23/50* | (2006.01) |

(52) U.S. Cl.
CPC .............. *G11B 5/41* (2013.01); *G11B 15/026* (2013.01); *G11B 15/60* (2013.01); *G11B 23/049* (2013.01); *G11B 23/502* (2013.01); *Y10S 15/12* (2013.01)

(58) Field of Classification Search
None
See application file for complete search history.

(56) References Cited

U.S. PATENT DOCUMENTS

| | | | | |
|---|---|---|---|---|
| 4,631,615 | A | * 12/1986 | Grossman et al. | ... G11B 23/049 360/128 |
| 4,722,016 | A | * 1/1988 | Shirako et al. | ...... G11B 23/049 360/128 |

(Continued)

FOREIGN PATENT DOCUMENTS

| | | |
|---|---|---|
| EP | 0127657 B1 | 4/1987 |
| JP | H09120512 A | 5/1997 |
| JP | 2000311318 A * | 11/2000 ............... G11B 5/41 |

OTHER PUBLICATIONS

IBM et al., "Head Cleaner Cartridge," An IP.com Prior Art Database Technical Disclosure, Original Publication Date: Mar. 1, 1985, Electronic Publication Date: Feb. 18, 2005, IPCOM000063445D, 3 pages. https://priorart.ip.com/IPCOM/000063445.

*Primary Examiner* — Craig A. Renner
(74) *Attorney, Agent, or Firm* — Yee & Associates, P.C.

(57) ABSTRACT

A tape cartridge for increasing tape drive head performance is provided. The tape cartridge comprises a cleaning tape, a tape guide arrangement that guides the cleaning tape within the cleaner cartridge, a cleaning fluid application arrangement that applies cleaning fluid to the cleaning tape within the cleaner cartridge, and a cartridge memory that stores cleaning count and motor taches count information. The tape guide arrangement is operable to bring the cleaning tape in contact with the cleaning fluid application arrangement to apply the cleaning fluid onto the cleaning tape when the cleaning tape is subject to a first tension level and avoid the contact with the cleaning fluid application arrangement when the cleaning tape is subject to a second tension level to prevent application of the cleaning fluid onto the cleaning tape.

8 Claims, 9 Drawing Sheets

(56) References Cited

U.S. PATENT DOCUMENTS

| | | | | |
|---|---|---|---|---|
| 4,816,951 A | * | 3/1989 | Zago | G11B 5/41 |
| | | | | 360/128 |
| 5,047,887 A | * | 9/1991 | Boshek | G11B 23/049 |
| | | | | 360/128 |
| 5,638,236 A | | 6/1997 | Scott | |
| 2006/0209460 A1 | * | 9/2006 | Lau et al. | G11B 23/502 |
| | | | | 360/128 |

* cited by examiner

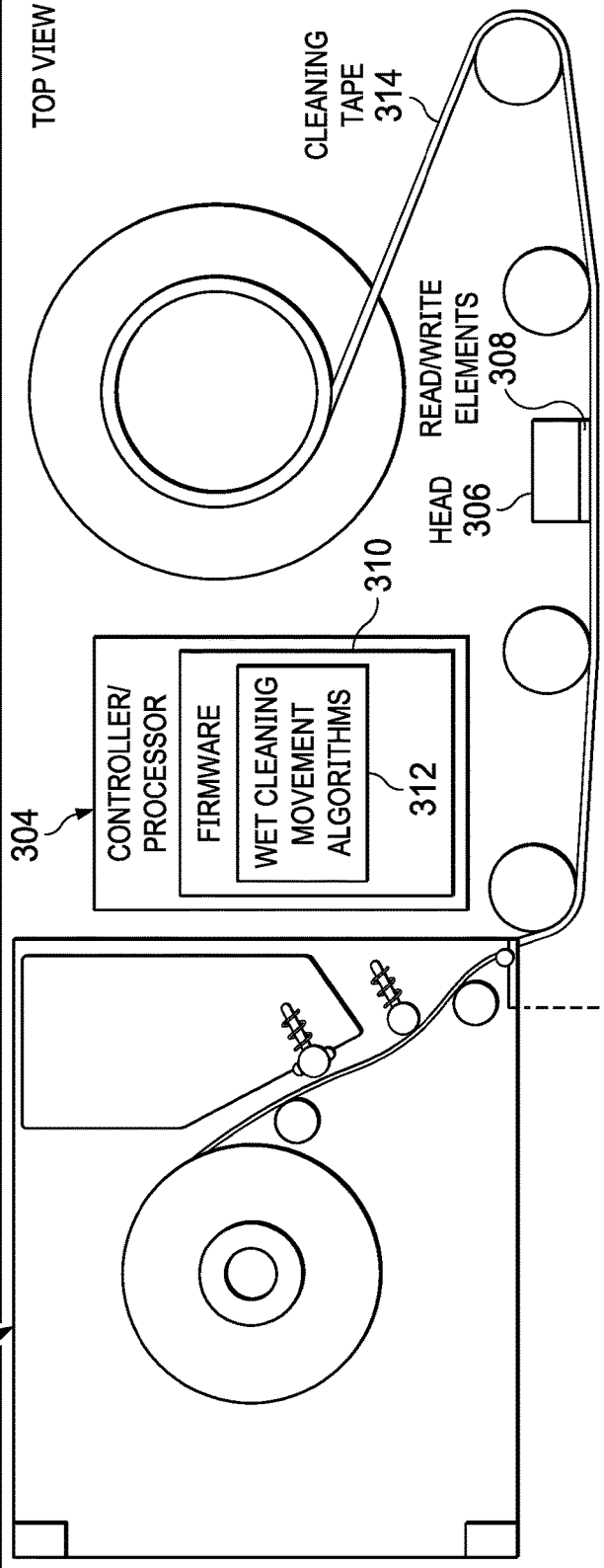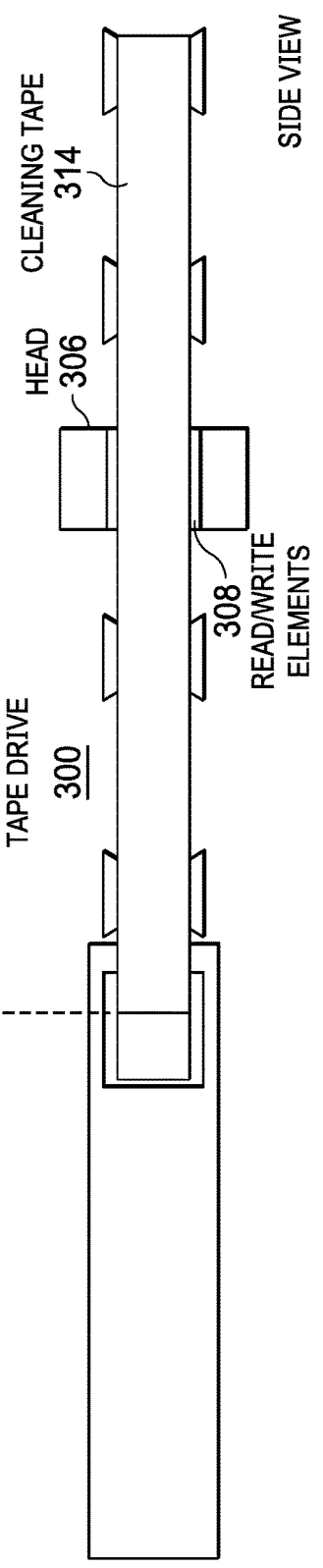
FIG. 3

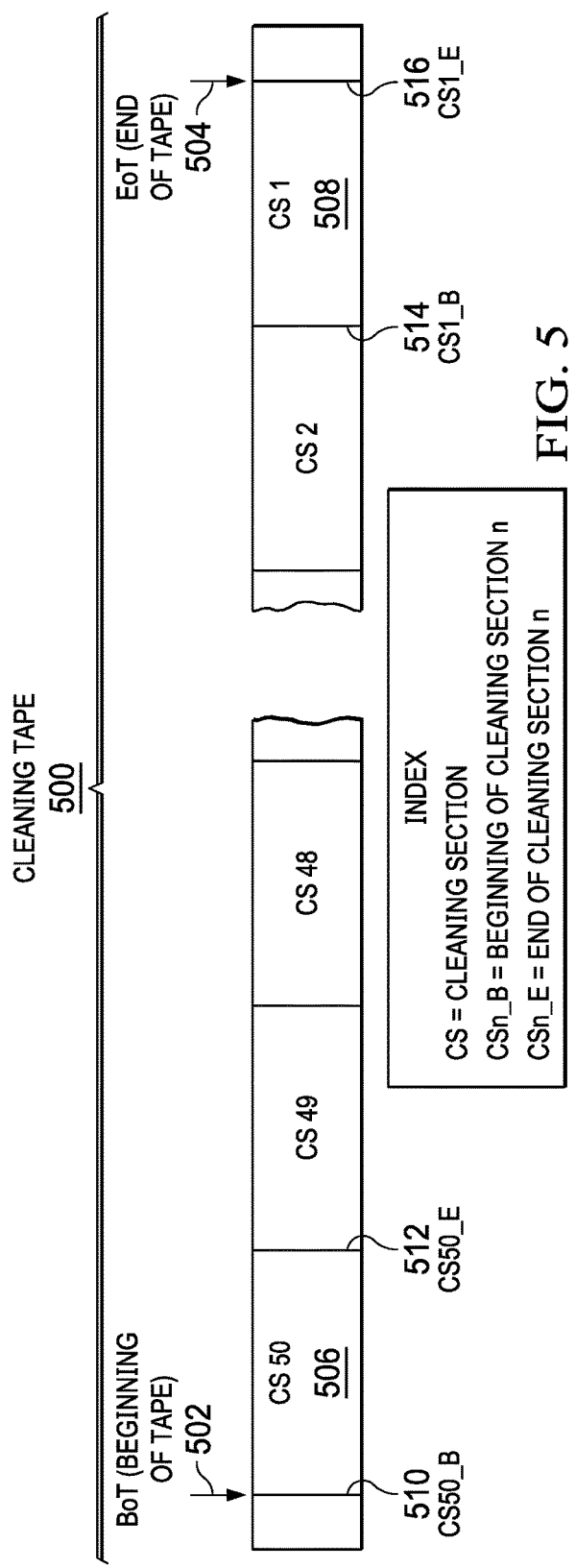

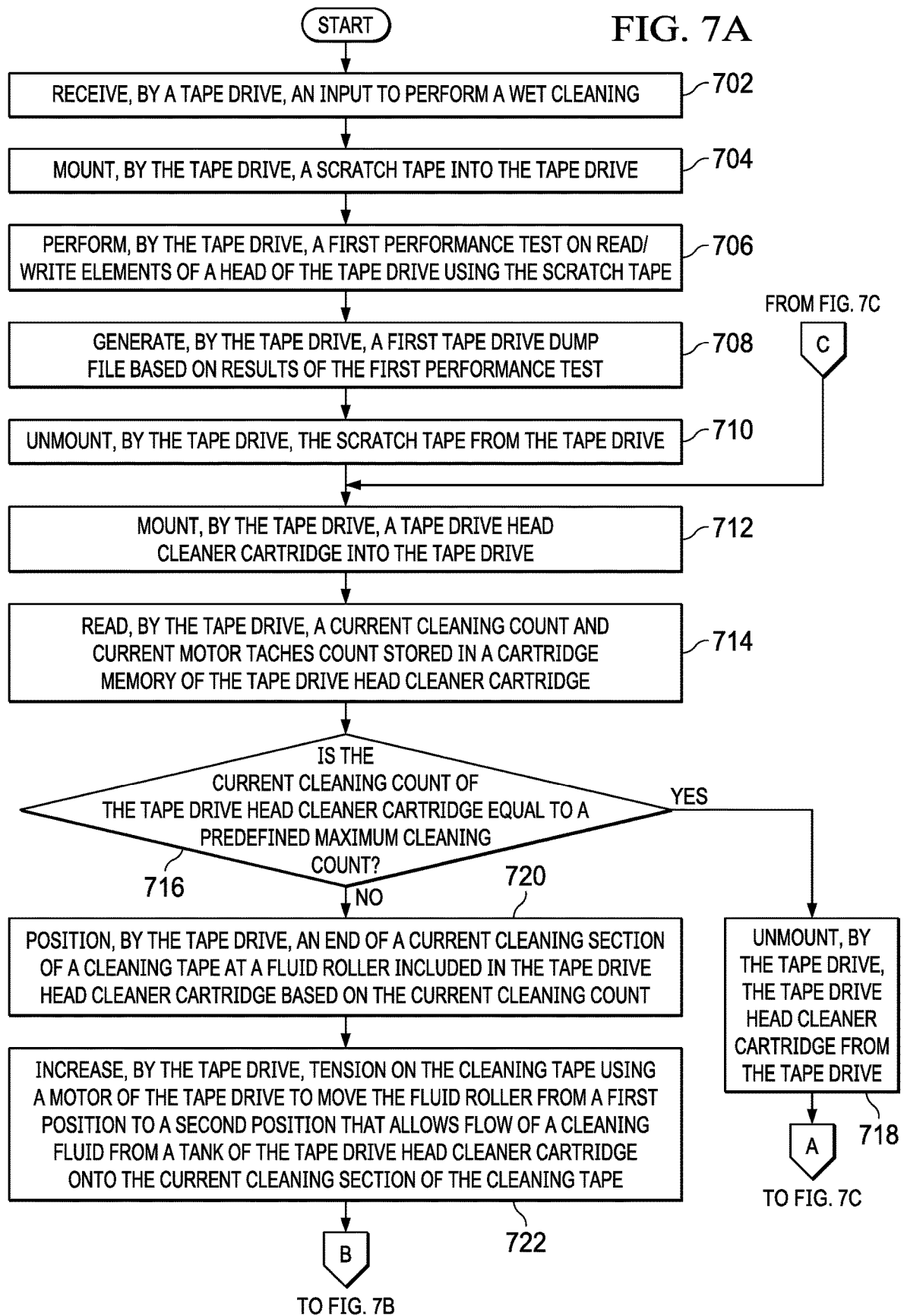

FIG. 7B

FROM FIG. 7A
B

724 — MOVE, BY THE TAPE DRIVE, THE CLEANING TAPE FROM THE END TO A BEGINNING OF THE CURRENT CLEANING SECTION USING THE MOTOR OF THE TAPE DRIVE TO MOISTEN A PREDEFINED LENGTH OF THE CURRENT CLEANING SECTION WITH THE CLEANING FLUID VIA THE FLUID ROLLER

726 — DECREASE, BY THE TAPE DRIVE, THE TENSION ON THE CLEANING TAPE USING THE MOTOR OF THE TAPE DRIVE TO MOVE THE FLUID ROLLER FROM THE SECOND POSITION TO THE FIRST POSITION THAT STOPS THE FLOW OF THE CLEANING FLUID FROM THE TANK OF THE TAPE DRIVE HEAD CLEANER CARTRIDGE ONTO THE CURRENT CLEANING SECTION OF THE CLEANING TAPE

728 — POSITION, BY THE TAPE DRIVE, THE BEGINNING OF THE CURRENT CLEANING SECTION MOISTENED WITH THE CLEANING FLUID AT THE READ/WRITE ELEMENTS OF THE HEAD OF THE TAPE DRIVE BASED ON THE CURRENT MOTOR TACHES COUNT

730 — SELECT, BY THE TAPE DRIVE, A WET CLEANING MOVEMENT ALGORITHM FROM A PLURALITY OF WET CLEANING MOVEMENT ALGORITHMS STORED IN FIRMWARE OF THE TAPE DRIVE BASED ON AN IDENTIFIED TYPE OF CONTAMINATION OF THE READ/WRITE ELEMENTS OF THE HEAD

732 — MOVE, BY THE TAPE DRIVE, THE PREDEFINED LENGTH OF THE CURRENT CLEANING SECTION MOISTENED WITH CLEANING FLUID AND THE READ/WRITE ELEMENTS OF THE HEAD IN ACCORDANCE WITH THE SELECTED WET CLEANING MOVEMENT ALGORITHM TO REMOVE THE IDENTIFIED TYPE OF CONTAMINATION FROM THE READ/WRITE ELEMENTS

734 — HAS A CURRENT CLEANING CYCLE OF THE SELECTED WET CLEANING MOVEMENT ALGORITHM ENDED? — NO

YES

D
TO FIG. 7C

INCREASING TAPE DRIVE HEAD PERFORMANCE WITH SECTIONAL CLEANING USING A CARTRIDGE MEMORY

BACKGROUND

1. Field

The disclosure relates generally to tape drives and more specifically to increasing tape drive head performance and reliability using a novel tape drive head cleaner cartridge that includes two new spring-loaded rollers, a cleaning fluid tank, and a cleaning tape comprised of a predefined number of cleaning sections.

2. Description of the Related Art

A tape drive is a program-controlled device that reads data from or writes data to a magnetic tape that moves past a read/write head. Typically, tape drives are used in conjunction with autoloaders and tape libraries, which automatically load, unload, and store multiple tapes, increasing the volume of data which can be stored without manual intervention. Magnetic tape data storage is typically used for backup and archival data storage. For example, magnetic tape media generally has a lower unit cost and longer archival stability. In addition, magnetic tape has a large capacity for storing data.

The magnetic tape is commonly housed in a casing known as a cartridge or cassette. Typically, the housing of the cartridge is made of plastic, sometimes with metal plates and parts, which permits easy handling of the magnetic tape, making it more convenient than having spools of exposed magnetic tape.

Also, it is important to keep in mind that magnetic tape can collect debris. The debris on the magnetic tape can be deposited onto tape drive components, such as head read/write elements and guide rollers, which are in contact with the magnetic tape. This deposited debris can result in increased tape drive component wear, decreased head performance, and the like.

SUMMARY

According to one illustrative embodiment, a tape cartridge for increasing tape drive head performance is provided. The tape cartridge comprises a cleaning tape, a tape guide arrangement that guides the cleaning tape within the cleaner cartridge, a cleaning fluid application arrangement that applies cleaning fluid to the cleaning tape within the cleaner cartridge, and a cartridge memory that stores cleaning count and motor taches count information. The tape guide arrangement is operable to bring the cleaning tape in contact with the cleaning fluid application arrangement to apply the cleaning fluid onto the cleaning tape when the cleaning tape is subject to a first tension level and avoid the contact with the cleaning fluid application arrangement when the cleaning tape is subject to a second tension level to prevent application of the cleaning fluid onto the cleaning tape.

According to other illustrative embodiments, a method and computer program product for increasing tape drive head performance are provided. A cleaning tape of a cleaner cartridge is transported by applying a mechanical tension to the cleaning tape at a first tension level until a first end of a current cleaning section of the cleaning tape is facing a cleaning fluid application arrangement of the cleaner cartridge during a wet cleaning operation. The cleaning tape of the cleaner cartridge is transported by applying the mechanical tension to the cleaning tape at a second tension level until a second end of the current cleaning section of the cleaning tape is facing the cleaning fluid application arrangement of the cleaner cartridge to moisten a length of the current cleaning section with a cleaning fluid from the first end to the second end. The current cleaning section of the cleaning tape moistened with the cleaning fluid is transported along a head of a tape drive to clean read/write elements of the head using the length of the current cleaning section during a cleaning cycle of the wet cleaning operation.

BRIEF DESCRIPTION OF THE DRAWINGS

FIG. 3 is a diagram illustrating an example of a tape drive head cleaner cartridge with decreased tape tension within a tape drive in accordance with an illustrative embodiment;

FIG. 5 is a diagram illustrating an example of a cleaning tape in accordance with an illustrative embodiment;

FIG. 6 is a diagram illustrating an example of a cartridge memory in accordance with an illustrative embodiment;

FIGS. 7A-7C are a flowchart illustrating a process for increasing tape drive head performance in accordance with an illustrative embodiment.

DETAILED DESCRIPTION

Figure 1:
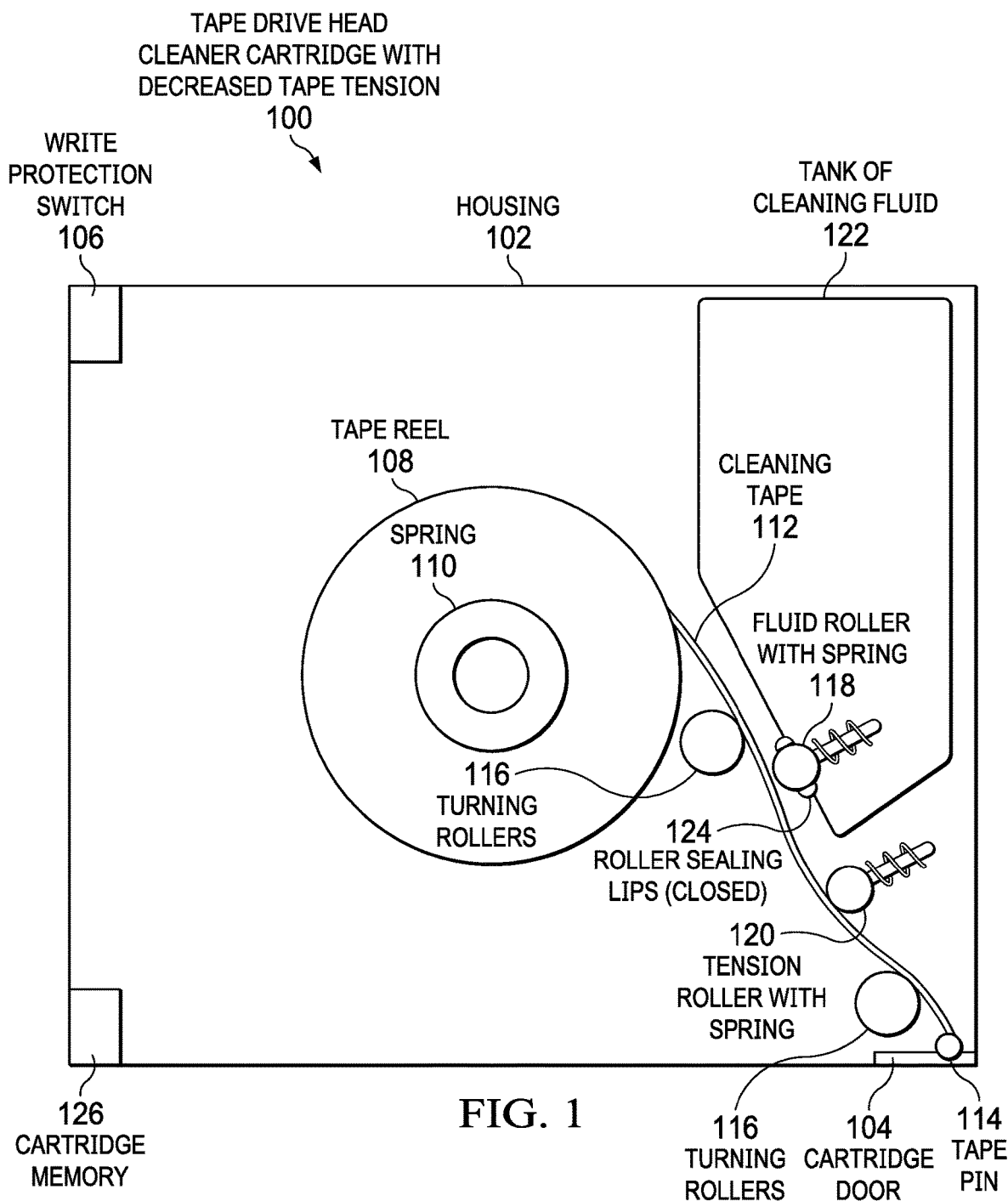
FIG. 1 is a diagram illustrating an example of a tape drive head cleaner cartridge with decreased tape tension in accordance with an illustrative embodiment.

Illustrative embodiments increase reliability and performance of tape drive head read/write elements. Further, illustrative embodiments increase the lifetime of the tape drive head and other tape drive components, such as tape guide rollers. Furthermore, illustrative embodiments increase data integrity (i.e., decrease data errors during tape read/write operations).

Conventional tape drive head cleaning can have a negative effect, depending on the type of head contamination. Further, utilization of a conventional cleaning cartridge multiple times may not increase tape drive performance. Illustrative embodiments utilize a tape drive head cleaner cartridge, which includes a tank of cleaning fluid.

Wet tape drive head cleaning is more effective than conventional tape drive cleaning methods. For example, current tape drives are sensitive to contamination coming from the tape material, itself, and the customer environment because of higher linear density (i.e., higher linear density increases tape cartridge capacity, while increasing the number of wraps and number of datasets written per track). Further, future generations of tape drives will use "high bandwidth head actuators", which will allow for reading and writing of data at a much higher linear density as compared to today. These future tape drives will be even more sensitive to contamination and debris.

Illustrative embodiments clean tape drive heads using the cleaning fluid contained in the tank of the tape drive head cleaner cartridge. However, it should be noted that the tape drive head cleaner cartridge of illustrative embodiments should only be used when conventional tape drive head cleaning will not work and is requested by development or a subject matter expert. Cases where conventional tape drive head cleaning fail are typically related to issues regarding tape manufacturing or high usage. Tape manufacturing issues and high tape usage will contaminate the tape drive head read/write elements with debris. The tape drive head cleaner cartridge of illustrative embodiments removes such debris and reduces tape drive field replacements. However, as noted above, the tape drive head cleaner cartridges of illustrative embodiments are not meant to replace conventional tape drive cleaner cartridges. Further, the tape drive cleaner cartridges of illustrative embodiments should not be permanently located in a customer tape library. A tape library is a storage device that contains one or more tape drives, slots to hold a multitude of tape cartridges, a barcode reader to identify tape cartridges, and a mechanism for automatically loading tape cartridges into the one or more tape drives (e.g., a robot).

Illustrative embodiments utilize a standard tape cartridge housing and add a novel mechanism that enables moistening or dampening of a predefined length of the cleaning tape. Illustrative embodiments partition the cleaning tape into a predefined number of cleaning sections, such as, for example, 50. However, different illustrative embodiments may utilize any number of cleaning sections, such as, for example, 40-100 cleaning sections. Illustrative embodiments utilize each cleaning section only once for tape drive head cleaning to avoid cross contamination. The length of each cleaning section may be, for example, 25 centimeters. However, different illustrative embodiments may utilize any cleaning section length, such as, for example, 25-40 centimeters.

Illustrative embodiments implement two new rollers in the tape drive head cleaner cartridge to guide the cleaning tape at a predefined angle (i.e., curvature of the cleaning tape caused by positions of the two new rollers) within the cartridge. One of the new rollers (i.e., a tension roller with spring) controls the distance between the cleaning tape and the second new roller (i.e., the fluid roller with spring). The position of the tension roller with spring is controlled by the tape drive motor. The tank within the tape drive head cleaner cartridge includes the fluid roller with spring, which is located adjacent to the path of the cleaning tape, and the cleaning fluid.

In response to receiving a wet cleaning request, a controller/processor of the tape drive, which includes firmware, loads the tape drive head cleaner cartridge into the tape drive. Then, the controller/processor of the tape drive reads a cartridge memory of the tape drive head cleaner cartridge. The cartridge memory stores the current cleaning count (i.e., number of cleaning sections of the cleaning tape already used during previous tape drive head cleaning cycles) and the corresponding taches count for the motor. Based on the data stored in the cartridge memory, the controller/processor of the tape drive instructs the motor to pull the cleaning tape to the correct position (i.e., end of current cleaning section number "n" ("CSn_E")). Illustrative embodiments utilize the cleaning tape from end of tape ("EoT") to beginning of tape ("BoT"). In other words, the controller/processor of the tape drive utilizes the end of the cleaning tape for the first tape drive head cleaning operation. This reverse order of using cleaning sections prevents cross-contamination by preventing already used cleaning sections to be moved across the tape drive head read/write elements.

To position the cleaning tape to the correct cleaning section of the cleaning tape, the controller/processor of the tape drive reads the taches count for the motor from the cartridge memory. After correctly positioning the cleaning tape based on the motor taches count, the controller/processor of the tape drive instructs the motor to increase the tension on the cleaning tape within the tape drive head cleaner cartridge, which moves the fluid roller with spring to a new position for moistening the predefined length (e.g., 25 centimeters) of the current cleaning section with the cleaning fluid.

After the predefined length of the current cleaning section is moistened with the cleaning fluid, the controller/processor of the tape drive instructs the motor to decrease the tension on the cleaning tape within the tape drive head cleaner cartridge, which moves the fluid roller with spring to an original position for stopping the flow of the cleaning fluid from the tank. Then, the controller/processor of the tape drive positions the current cleaning section to the tape drive head to begin the wet cleaning operation. The firmware of the controller/processor controls this entire process, which is necessary to run the wet cleaning operation.

After the moistened current cleaning section is positioned at the tape drive head read/write elements, the controller/processor of the tape drive selects a cleaning algorithm stored in the firmware. Depending on the selected cleaning algorithm, the controller/processor of the tape drive directs the motor to move the cleaning tape forward and backward, stopping and starting the movement of the cleaning tape within the predefined length of the current cleaning section (e.g., 25 cm) in accordance with the selected cleaning algorithm. During movement of the cleaning tape, the controller/processor of the tape drive moves the tape drive head up and down and slightly moves the read/write elements of the head from side to side, for example, to improve performance of the cleaning process.

The amount of cleaning fluid originally contained in the tank is sufficient to moisten the entire length of the cleaning tape material. As a result, refilling the liquid tank is unnecessary. However, in an alternative illustrative embodiment, the tank may be a tank that is refillable or an exchangeable tank that is prefilled with the cleaning fluid. In response to increased tension on the cleaning tape within the tape drive head cleaner cartridge, the fluid roller with spring is pushed back away from the roller sealing lips of the tank to a position that allows the fluid roller to rotate and cleaning fluid to flow from the tank.

The now rotating fluid roller applies the cleaning fluid to the current cleaning section of the moving cleaning tape. It should be noted that the amount of roughness of the fluid roller surface can determine the amount of cleaning fluid that is applied to the current cleaning section of the cleaning tape. In other words, increased roughness of the fluid roller surface equals an increased amount of cleaning fluid being applied to the current cleaning section.

The tape drive motor controls the tension on the cleaning tape, which controls the position of the fluid roller in relation to the roller sealing lips of the tank (i.e., decreased tension on the cleaning tape equals a position of the fluid roller in contact with the roller sealing lips of the tank stopping flow of the cleaning fluid and increased tension on the cleaning tape equals a position of the fluid roller away from the roller sealing lips of the tank allowing flow of the cleaning fluid). Only when the current cleaning section of the cleaning tape is to be moistened, is the fluid roller with spring pushed back to open the roller sealing lips. Conversely, when decreased or no tension exists on the cleaning tape, is the fluid roller with spring pushed forward against the roller sealing lips to prevent flow of the cleaning fluid from the liquid tank.

It should be noted that the cleaning tape does not include servo tracks for cleaning tape positioning. The controller/processor of the tape drive utilizes taches count of the motor to position the cleaner tape to the correct cleaning section. The cartridge memory of the tape drive head cleaner cartridge contains a table of the taches counts, which starts with taches count 0 (i.e., leader pin in cleaner cartridge housing), along with their corresponding cleaning counts. It should be noted that taches counts are not linear to the cleaning counts. For example, one cleaning count, which corresponds to one cleaning section of the cleaning tape, is equal to 625 taches.

The controller/processor of the tape drive can use different cleaning algorithms to handle different types of contamination of the head read/write elements. The controller/processor of the tape drive can change the cleaning algorithm via microcode of the firmware. The cleaning algorithm defines, for example, the number of times a current cleaning section of the cleaning tape is moved across the tape drive head, the up and down and lateral movement of the head and read/write elements, the amount of time the tape drive head read/write elements are exposure to the cleaning fluid, the overall cleaning time for the current cleaning cycle, the overall drying time for the current cleaning cycle, amount of tension on the cleaning tape, a defined time interval until a next cleaner cartridge mount is allowed, and the like.

Before and after a wet cleaning of the tape drive head, the controller/processor of the tape drive loads a "scratch tape" (i.e., a blank or empty tape) into the tape drive for tape drive head read/write element performance testing. Illustrative embodiments utilize a tape diagnostic tool to analyze the tape drive dump file for the result of the tape drive head read/write element performance testing. A tape drive dump file provides useful information for tape drive/tape problem analysis. For example, the tape drive dump file contains information regarding encountered problems during reading/writing of data on the magnetic tape by the tape drive, data integrity, tape drive performance, and the like. Illustrative embodiments can output the result of the performance testing to determine how effective a cleaning cycle was (e.g., by comparing the pre-cleaning cycle tape drive dump file with the post-cleaning cycle tape drive dump file) and whether further cleaning cycles are needed.

Illustrative embodiments may utilize different cleaning fluids to clean the head read/write elements and guide rollers of the tape drive. For example, illustrative embodiments may utilize alcohol, such as isopropyl alcohol or rubbing alcohol, as an effective cleaning fluid for the read/write elements and guide rollers of the tape drive. Alternatively, illustrative embodiments may utilize acetone. In a preferred illustrative embodiment isopropyl alcohol is used. Isopropyl alcohol is capable of dissolving ethyl cellulose, polyvinyl butyral, many oils, alkaloids, gums, and natural resins, which may accumulate on the drive head read/write elements and guide rollers of the tape drive, along with other contaminants, such as metal oxides, particles, dirt, dust, and the like.

Illustrative embodiments may utilize commercially available material for the cleaning tape. For example, illustrative embodiments may utilize a prewashed microfiber or micro-woven cleaning ribbon as the cleaning tape material. A micro-woven cleaning ribbon is lint-free, impregnated with an anti-static agent, and highly absorbent, while capturing microscopic dust, particulate debris, oils, and other contaminants.

Thus, illustrative embodiments provide one or more technical solutions that overcome a technical problem with removing tape drive head contaminants to increase tape drive head performance and life expectancy. As a result, these one or more technical solutions provide a technical effect and practical application in the field of tape drives.

With reference now to the figures, and in particular, with reference to FIGS. 1-4, diagrams of environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a diagram illustrating an example of a tape drive head cleaner cartridge with decreased tape tension in accordance with an illustrative embodiment. Tape drive head cleaner cartridge with decreased tape tension 100 includes housing 102. Housing 102 may be, for example, a standard tape cartridge housing comprised of plastic, metal, or a combination thereof. Housing 102 includes cartridge door 104, write protection switch 106, tape reel 108, and spring 110.

Cleaning tape 112 is wound on tape reel 108. Cleaning tape 112 includes tape pin 114, which is used to pull cleaning tape 112 from housing 102 via cartridge door 104. Cleaning tape 112 is comprised of a defined number of individual cleaning sections, each individual cleaning section is of a predefined length with a defined beginning point and a defined end point. The defined number of individual cleaning sections may be, for example, 40-100 cleaning sections depending on different illustrative embodiments. The predefined length of each individual cleaning section may be, for example, 25-40 centimeters depending on the different illustrative embodiments. It should be noted that illustrative embodiments use a given cleaning section only once.

Housing 102 also includes turning rollers 116, fluid roller with spring 118, tension roller with spring 120, and tank of cleaning fluid 122. However, it should be noted that fluid roller with spring 118, tension roller with spring 120, and tank of cleaning fluid 122 are novel features of the tape drive head cleaner cartridge. Turning rollers 116 represent a set of one or more rollers to guide cleaning tape 112 within housing 102. In addition, turning rollers 116 are positioned on an opposite side of cleaning tape 112 as compared to fluid roller with spring 118 and tension roller with spring 120.

Fluid roller with spring 118 is a spring-loaded roller that applies cleaning fluid to cleaning tape 112. However, it should be noted that in this example, fluid roller with spring 118 is not in contact with cleaning tape 112 due to tension roller with spring 120, which is its initial or original position, pushing on cleaning tape 112 creating a curvature in cleaning tape 112 away from fluid roller with spring 118. Also, it should be noted that fluid roller with spring 118 is in its initial or original position, which is in contact with roller sealing lips 124 preventing flow of cleaning fluid from tank of cleaning fluid 122. Roller sealing lips 124 are integral with tank of cleaning fluid 122 and may be comprised of, for example, rubber, plastic, metal, or any combination thereof.

Housing 102 further includes cartridge memory 126. Cartridge memory 126 may represent any type of persistent data storage device capable of being placed within housing 102. Cartridge memory 126 stores a table of cleaning counts and motor taches counts. The cleaning count represents the current number of cleaning sections of cleaning tape 112 already used in previous wet cleaning operations. The motor taches count represents the number of motor tags or turns it takes to properly position a current cleaning section (i.e., a next cleaning section following the last used cleaning section, which is designated by the current cleaning count) of cleaning tape 112 at a head of a tape drive to be wet cleaned. It should be noted that one cleaning count is equal to a predefined number of motor taches, such as, for example, 625.

Figure 2:
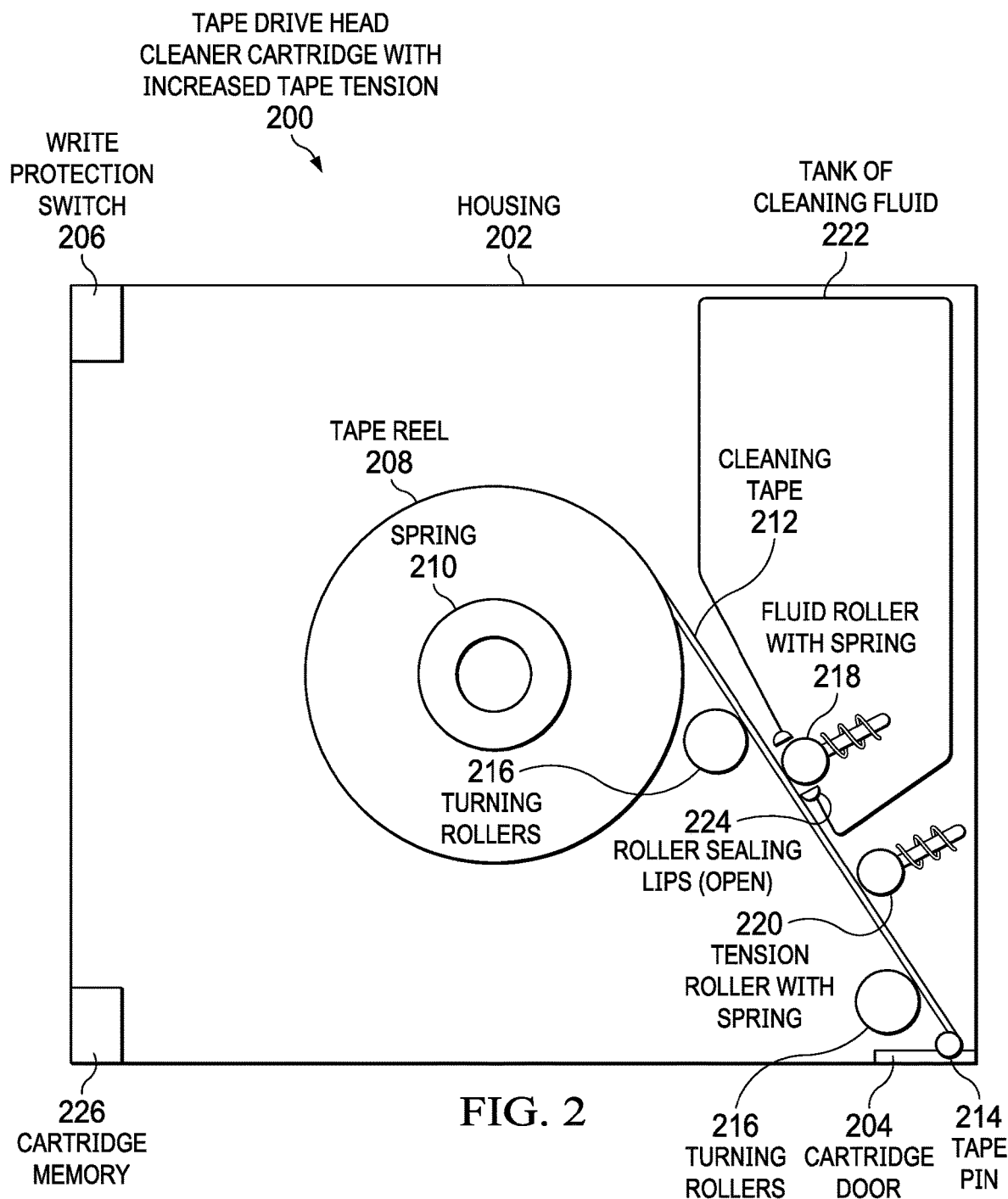
FIG. 2 is a diagram illustrating an example of a tape drive head cleaner cartridge with increased tape tension in accordance with an illustrative embodiment.

With reference now to FIG. 2, a diagram illustrating an example of a tape drive head cleaner cartridge with increased tape tension is depicted in accordance with an illustrative embodiment. Tape drive head cleaner cartridge with increased tape tension 200 includes housing 202, cartridge door 204, write protection switch 206, tape reel 208, spring 210, cleaning tape 212, tape pin 214, turning rollers 216, fluid roller with spring 218, tension roller with spring 220, tank of cleaning fluid 222, roller sealing lips 224, and cartridge memory 226. It should be noted that housing 202, cartridge door 204, write protection switch 206, tape reel 208, spring 210, cleaning tape 212, tape pin 214, turning rollers 216, fluid roller with spring 218, tension roller with spring 220, tank of cleaning fluid 222, roller sealing lips 224, and cartridge memory 226 are the same as housing 102, cartridge door 104, write protection switch 106, tape reel 108, spring 110, cleaning tape 112, tape pin 114, turning rollers 116, fluid roller with spring 118, tension roller with spring 120, tank of cleaning fluid 122, roller sealing lips 124, and cartridge memory 126 in FIG. 1.

However, in the example of FIG. 2 it should be noted that cleaning tape 212 now has increased tension (i.e., is straightened without curvature between turning rollers 216), which causes tension roller with spring 220 to be pushed backward or in its secondary spring-compressed position as compared to its initial position as shown by tension roller with spring 120 in FIG. 1. In addition, fluid roller with spring 218 is now in contact with cleaning tape 212. As a result of being in contact with cleaning tape 212, fluid roller with spring 218 is now pushed backward or in its secondary spring-compressed position as compared to its initial position as shown by fluid roller with spring 118 in FIG. 1. In other words, fluid roller with spring 218 is now pushed back away from (i.e., not in contact with) roller sealing lips 224, which allows cleaning fluid from tank of cleaning fluid 222 to moisten cleaning tape 212 via fluid roller with spring 218. It should be noted that fluid roller with spring 218 only moistens the current cleaning section of cleaning tape 212 for the current wet cleaning operation.

With reference now to FIG. 3, a diagram illustrating an example of a tape drive head cleaner cartridge with decreased tape tension within a tape drive is depicted in accordance with an illustrative embodiment. This example depicts a top and side view of tape drive 300. Tape drive 300 may represent any type of tape drive, such as, for example, a linear tape-open tape drive.

In this example, tape drive 300 is loaded with tape drive head cleaner cartridge with decreased tape tension 302. Tape drive head cleaner cartridge with decreased tape tension 302 is the same as tape drive head cleaner cartridge with decreased tape tension 100 in FIG. 1 showing the same components in the same initial positions preventing application of cleaning fluid onto cleaning tape 314.

Tape drive 300 includes controller/processor 304, head 306, and read/write elements 308. Controller/processor 304 may be a set of one or more hardware processor devices. Controller/processor 304 includes firmware 310. Controller/processor 304 executes instructions loaded in firmware 310 to control the operation of tape drive 300. Firmware 310 is also loaded with wet cleaning movement algorithms 312. Wet cleaning movement algorithms 312 represent a plurality of different algorithms for performing different wet cleaning operations on head 306 and read/write elements 308 using cleaning tape 314.

Figure 4:
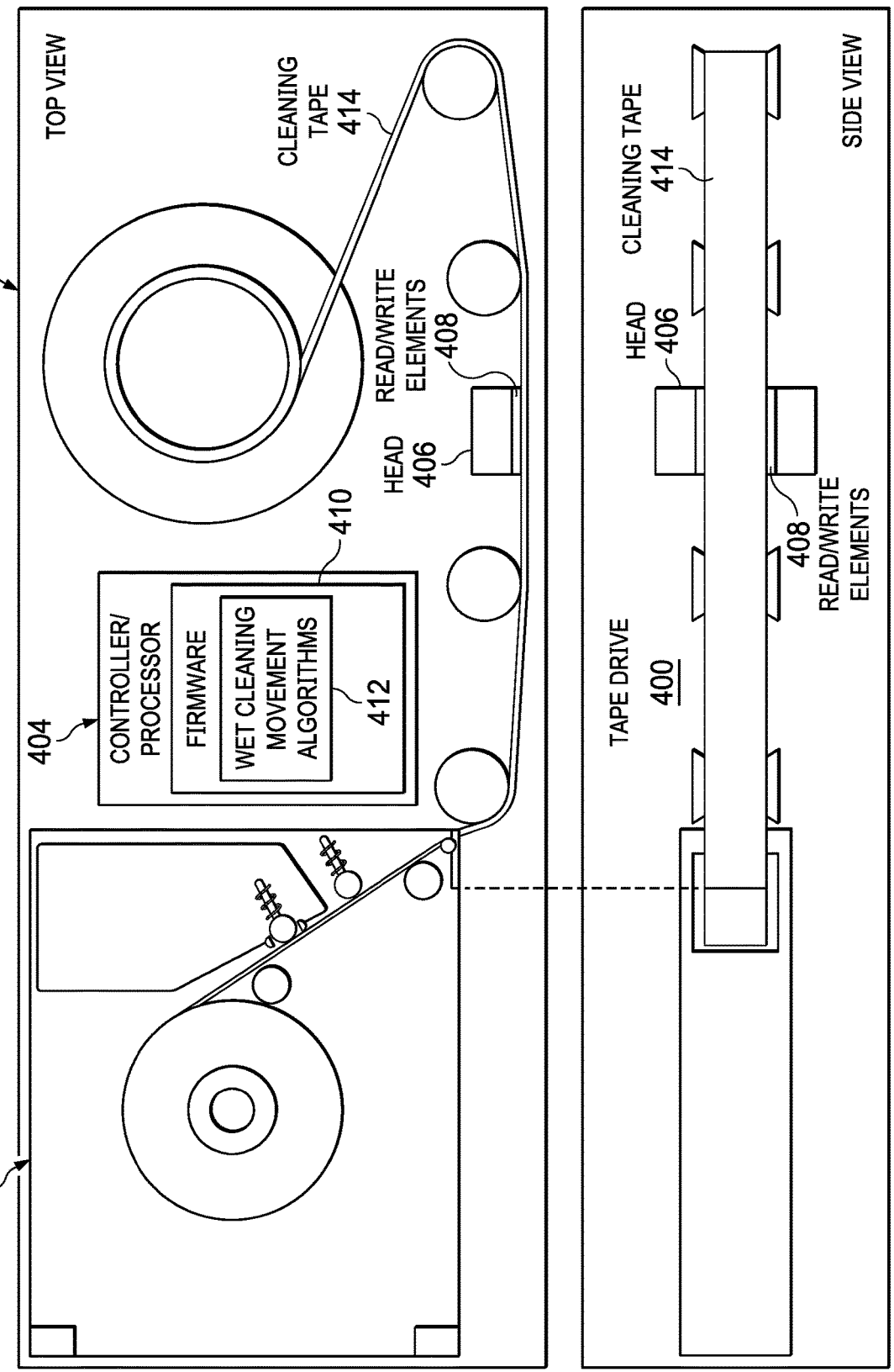
FIG. 4 is a diagram illustrating an example of a tape drive head cleaner cartridge with increased tape tension within a tape drive in accordance with an illustrative embodiment.

With reference now to FIG. 4, a diagram illustrating an example of a tape drive head cleaner cartridge with increased tape tension within a tape drive is depicted in accordance with an illustrative embodiment. This example depicts a top and side view of tape drive 400. Tape drive 400 is the same as tape drive 300 in FIG. 3.

However, in this example, tape drive 400 is loaded with tape drive head cleaner cartridge with increased tape tension 402. Tape drive head cleaner cartridge with increased tape tension 402 is the same as tape drive head cleaner cartridge with increased tape tension 200 in FIG. 2 showing the same components in the same secondary positions allowing application of cleaning fluid to a current cleaning section of cleaning tape 414.

Tape drive 400 includes controller/processor 404, head 406, and read/write elements 408, such as controller/processor 304, head 306, and read/write elements 308 in FIG. 3. Controller/processor 404 includes firmware 410, such as firmware 310 in FIG. 3. Firmware 410 contains wet cleaning movement algorithms 412, such as wet cleaning movement algorithms 312 in FIG. 3.

Controller/processor 404 selects a particular wet cleaning movement algorithm from wet cleaning movement algorithms 412 depending on the type of debris contaminating head 406 and read/write elements 408. For example, each particular wet cleaning movement algorithm moves cleaning tape 414, head 306, and read/write elements 308 in different directions, for different amounts of time, to remove the particular type of debris identified on head 406 and read/write elements 408 using only a current cleaning section of cleaning tape 414 moistened with cleaning fluid.

With reference now to FIG. 5, a diagram illustrating an example of a cleaning tape is depicted in accordance with an illustrative embodiment. Cleaning tape 500 may be, for example, cleaning tape 112 in FIG. 1, cleaning tape 212 in FIG. 2, cleaning tape 314 in FIG. 3, or cleaning tape 414 in FIG. 4. Cleaning tape 500 includes beginning of tape ("BoT") 502 and end of tape ("EoT") 504. Further, cleaning tape 500 is comprised of a plurality of cleaning sections.

In this example, cleaning tape 500 is comprised of 50 cleaning sections (i.e., from cleaning section 50 506 to cleaning section 1 508. However, it should be noted that cleaning tape 500 is meant as an example only and not as a limitation on different illustrative embodiments. In other words, cleaning tape 500 may include more or fewer cleaning section than shown.

Also, it should be noted that cleaning section 50 506 is located at BoT 502 and cleaning section 1 508 is located at EoT 504. In other words, cleaning section numbering is in reverse order to prevent cross contamination. Further, each cleaning section has a defined beginning ("B") point and a defined end ("E") point. For example, cleaning section ("CS") 50 506 starts at CS50_B 510 and ends at CS50_E 512 and cleaning section ("CS") 1 508 starts at CS_B 514 and ends at CS_E 516. The distance between CS50_B 510 and CS50_E 512 and CS1_B 514 and CS1_E 516 is a predefined distance, such as, for example, 25 centimeters.

With reference now to FIG. 6, a diagram illustrating an example of a cartridge memory is depicted in accordance with an illustrative embodiment. Cartridge memory 600 may be, for example, cartridge memory 126 in FIG. 1 or cartridge memory 226 in FIG. 2. Cartridge memory 600 stores table 602. In this example, table 602 includes cleaning count 604, tape position 606, tape movement in centimeters 608, and tape movement in motor taches 610. It should be noted that in this example, cleaning count 604 is from 1 to 50. In other words, the cleaning tape was comprised of 50 cleaning sections.

Figure 7C:
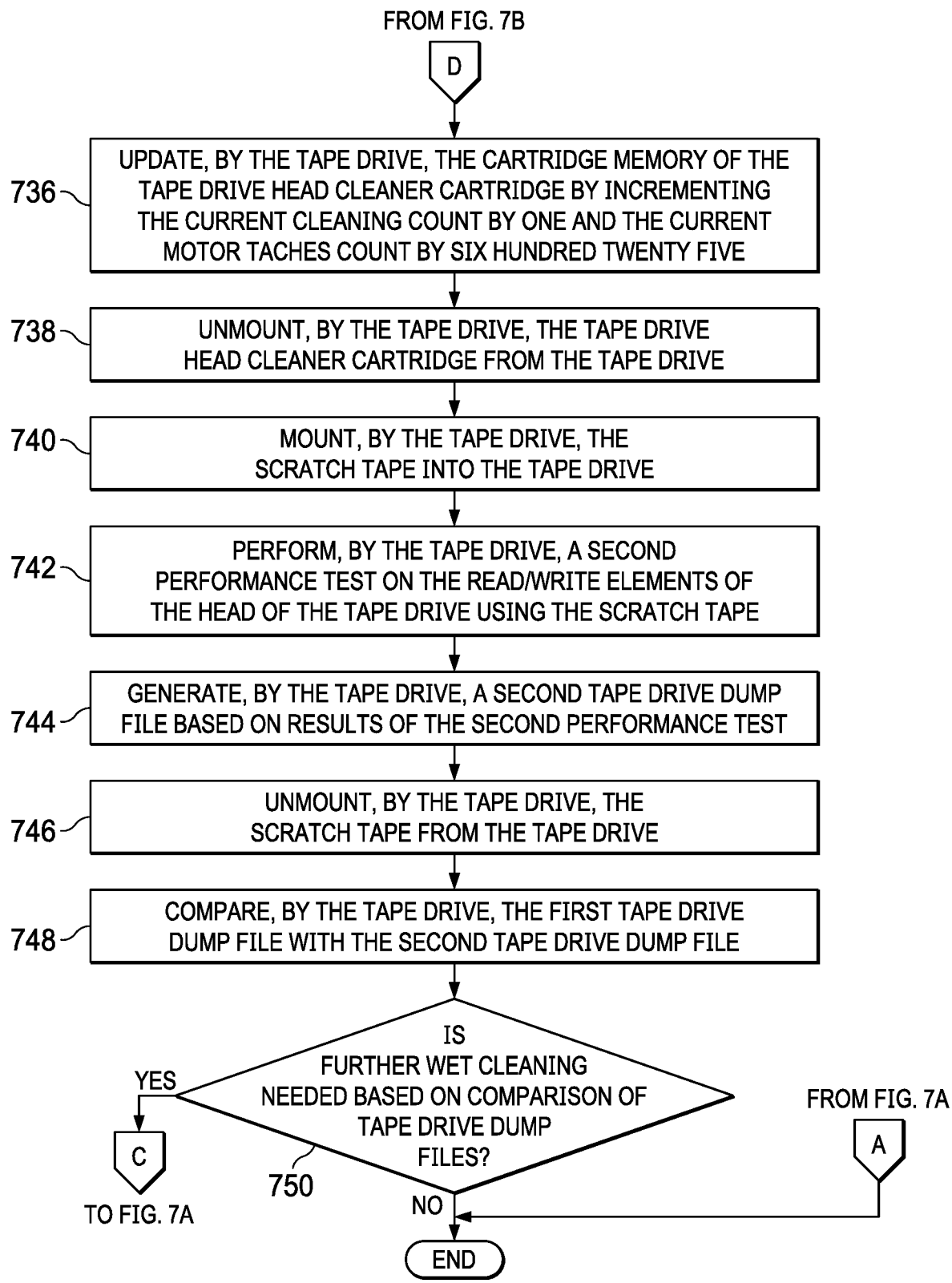

With reference now to FIGS. 7A-7C, a flowchart illustrating a process for increasing tape drive head performance is shown in accordance with an illustrative embodiment. The process shown in FIGS. 7A-7C may be implemented in a tape drive, such as, for example, tape drive 300 in FIG. 3 or tape drive 400 in FIG. 4.

The process begins when the tape drive receives an input to perform a wet cleaning (step 702). The tape drive mounts a scratch tape into the tape drive (step 704). The tape drive performs a first performance test on read/write elements of a head of the tape drive using the scratch tape (step 706). The tape drive generates and stores a first tape drive dump file based on results of the first performance test (step 708). The tape drive then unmounts the scratch tape from the tape drive (step 710).

Afterward, the tape drive mounts a tape drive head cleaner cartridge of illustrative embodiments into the tape drive (step 712). In addition, the tape drive reads a current cleaning count and current motor taches count stored in a cartridge memory of the tape drive head cleaner cartridge (step 714). The tape drive makes a determination as to whether the current cleaning count of the tape drive head cleaner cartridge is equal to a predefined maximum cleaning count (e.g., 50) (step 716).

If the tape drive determines that the current cleaning count of the tape drive head cleaner cartridge is equal to the predefined maximum cleaning count, yes output of step 716, then the tape drive unmounts the tape drive head cleaner cartridge from the tape drive (step 718) and the process terminates thereafter. If the tape drive determines that the current cleaning count of the tape drive head cleaner cartridge is less than the predefined maximum cleaning count, no output of step 716, then the tape drive positions an end of a current cleaning section of a cleaning tape at a fluid roller included in the tape drive head cleaner cartridge based on the current cleaning count (step 720).

Further, the tape drive increases tension on the cleaning tape using a motor of the tape drive to move the fluid roller from a first position to a second position that allows flow of a cleaning fluid from a tank of the tape drive head cleaner cartridge onto the current cleaning section of the cleaning tape (step 722). Furthermore, the tape drive moves the cleaning tape from the end to a beginning of the current cleaning section using the motor of the tape drive to moisten a predefined length of the current cleaning section (e.g., 25 centimeters) with the cleaning fluid via the fluid roller (step 724).

Afterward, the tape drive decreases the tension on the cleaning tape using the motor of the tape drive to move the fluid roller from the second position to the first position that stops the flow of the cleaning fluid from the tank of the tape drive head cleaner cartridge onto the current cleaning section of the cleaning tape (step 726). Then, the tape drive positions the beginning of the current cleaning section moistened with the cleaning fluid at the read/write elements of the head of the tape drive based on the current motor taches count (step 728).

Moreover, the tape drive selects a wet cleaning movement algorithm from a plurality of wet cleaning movement algorithms stored in firmware of the tape drive based on an identified type of contamination of the read/write elements of the head (step 730). The tape drive moves the predefined length of the current cleaning section moistened with cleaning fluid and the read/write elements of the head in accordance with the selected wet cleaning movement algorithm to remove the identified type of contamination from the read/write elements (step 732). The tape drive makes a determination as to whether a current cleaning cycle of the selected wet cleaning movement algorithm has ended (step 734).

If the tape drive determines that the current cleaning cycle of the selected wet cleaning movement algorithm has not ended, no output of step 734, then the process returns to step 732 where the tape drive continues to move the predefined length of the current cleaning section moistened with cleaning fluid and the read/write elements of the head in accordance with the selected wet cleaning movement algorithm. If the tape drive determines that the current cleaning cycle of the selected wet cleaning movement algorithm has ended, yes output of step 734, then the tape drive updates the cartridge memory of the tape drive head cleaner cartridge by incrementing the current cleaning count by one and the current motor taches count by six hundred twenty-five (step 736). In addition, the tape drive unmounts the tape drive head cleaner cartridge from the tape drive (step 738).

Subsequently, the tape drive mounts the scratch tape into the tape drive (step 740). Tape drive then performs a second performance test on the read/write elements of the head of the tape drive using the scratch tape (step 742). The tape drive generates and stores a second tape drive dump file based on results of the second performance test (step 744). The tape drive then unmounts the scratch tape from the tape drive (step 746).

The tape drive compares the first tape drive dump file with the second tape drive dump file (step 748). The tape drive makes a determination as to whether further wet cleaning is needed based on comparison of tape drive dump files (step 750). If the tape drive determines that further wet cleaning is needed based on the comparison of the tape drive dump files, yes output of step 750, then the process returns to step 712 where the tape drive remounts the tape drive head cleaner cartridge into the tape drive. If the tape drive determines that further wet cleaning is not needed based on the comparison of the tape drive dump files, no output of step 750, then the process terminates thereafter.

Figure 8:
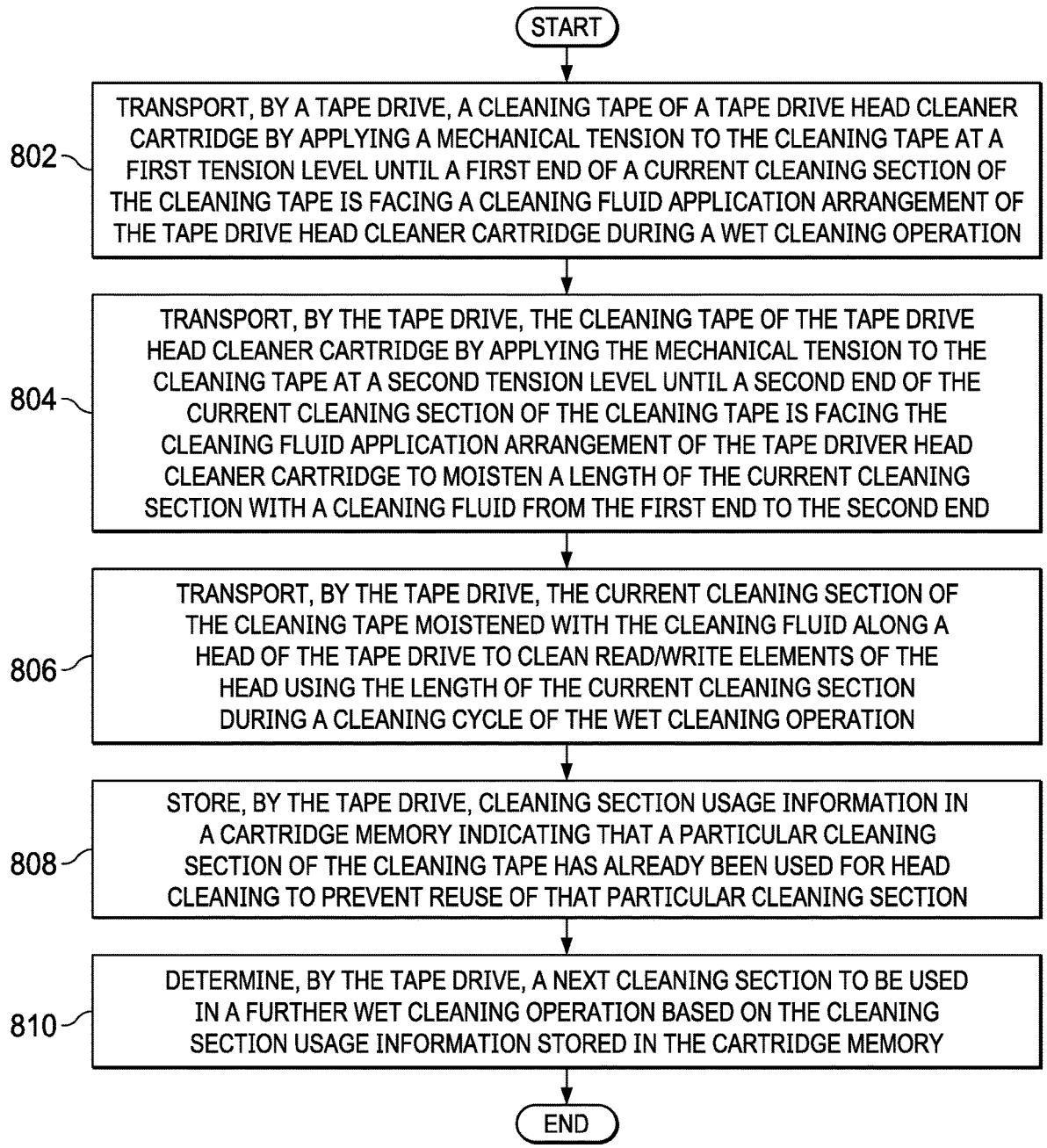
FIG. 8 is a flowchart illustrating a process for a wet cleaning operation in accordance with an illustrative embodiment.

With reference now to FIG. 8, a flowchart illustrating a process for a wet cleaning operation is shown in accordance with an illustrative embodiment. The process shown in FIG. 8 may be implemented in a tape drive, such as, for example, tape drive 300 in FIG. 3 or tape drive 400 in FIG. 4.

The process begins when the tape drive transports a cleaning tape of a tape drive head cleaner cartridge by applying a mechanical tension to the cleaning tape at a first tension level until a first end of a current cleaning section of the cleaning tape is facing a cleaning fluid application arrangement of the tape driver head cleaner cartridge during a wet cleaning operation (step 802). The tape drive then transports the cleaning tape of the tape drive head cleaner cartridge by applying the mechanical tension to the cleaning tape at a second tension level until a second end of the current cleaning section of the cleaning tape is facing the cleaning fluid application arrangement of the tape driver head cleaner cartridge to moisten a length of the current cleaning section (e.g., 25 centimeters) with a cleaning fluid from the first end to the second end (step 804).

Afterward, the tape drive transports the current cleaning section of the cleaning tape moistened with the cleaning fluid along a head of the tape drive to clean read/write elements of the head using the length of the current cleaning section during a cleaning cycle of the wet cleaning operation (step 806). In addition, the tape drive stores cleaning section usage information in a cartridge memory indicating that a particular cleaning section of the cleaning tape has already been used for head cleaning to prevent reuse of that particular cleaning section (step 808). Further, the tape drive determines a next cleaning section to be used in a further wet cleaning operation based on the cleaning section usage information stored in the cartridge memory (step 810). Thereafter, the process terminates.

Thus, illustrative embodiments provide a method, tape library storage system, and computer program product for increasing tape drive head performance and reliability. The novel tape drive head cleaner cartridge of illustrative embodiments for cleaning a tape drive storage device comprises a cleaning tape, a tape guide arrangement that guides the cleaning tape within the tape drive head cleaner cartridge, a cleaning fluid application arrangement that applies cleaning fluid to the cleaning tape within the tape drive head cleaner cartridge, and a cartridge memory that stores cleaning count and motor taches count information. The tape guide arrangement is operable to bring the cleaning tape in contact with the cleaning fluid application arrangement to apply cleaning fluid onto the cleaning tape when the cleaning tape is subject to a first tension level and avoid the contact with the cleaning fluid application arrangement when the cleaning tape is subject to a second tension level to prevent application of the cleaning fluid onto the cleaning tape. The first tension level corresponds to an increased mechanical tension applied to the cleaning tape as compared to the second tension level corresponding to a decreased mechanical tension applied to the cleaning tape. The tape guide arrangement comprises a tension roller facing a same surface of the cleaning tape as the cleaning fluid application arrangement. The tension roller is spring-loaded to allow movement of the tension roller in response to different amounts of mechanical tension being applied to the cleaning tape. The tape guide arrangement also comprises at least one turning roller facing an opposite surface of the cleaning tape with respect to a surface of the cleaning tape facing the tension roller and the cleaning fluid application arrangement. The cleaning fluid application arrangement comprises a fluid roller that is spring-loaded to allow movement of the fluid roller to and away from roller sealing lips of the cleaning fluid application arrangement in response to different tension levels being applied to the cleaning tape. The cleaning fluid application arrangement further comprises a cleaning fluid tank that includes the roller sealing lips and contains cleaning fluid to moisten the cleaning tape.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing tape drive head performance, the method comprising:
    transporting a cleaning tape of a cleaner cartridge by applying a mechanical tension to the cleaning tape at a first tension level until a first end of a current cleaning section of the cleaning tape is facing a cleaning fluid application arrangement of the cleaner cartridge during a wet cleaning operation;
    transporting the cleaning tape of the cleaner cartridge by applying the mechanical tension to the cleaning tape at a second tension level until a second end of the current cleaning section of the cleaning tape is facing the cleaning fluid application arrangement of the cleaner cartridge to moisten a length of the current cleaning section with a cleaning fluid from the first end to the second end;
    transporting the current cleaning section of the cleaning tape moistened with the cleaning fluid along a head of a tape drive to clean read/write elements of the head using the length of the current cleaning section during a cleaning cycle of the wet cleaning operation;
    storing cleaning section usage information in a cartridge memory indicating that a particular cleaning section of the cleaning tape has already been used for head cleaning to prevent reuse of that particular cleaning section; and
    determining a next cleaning section to be used in a further wet cleaning operation based on the cleaning section usage information stored in the cartridge memory.

2. A method for increasing tape drive head performance, the method comprising:
    transporting a cleaning tape of a cleaner cartridge by applying a mechanical tension to the cleaning tape at a first tension level until a first end of a current cleaning section of the cleaning tape is facing a cleaning fluid application arrangement of the cleaner cartridge during a wet cleaning operation;
    transporting the cleaning tape of the cleaner cartridge by applying the mechanical tension to the cleaning tape at a second tension level until a second end of the current cleaning section of the cleaning tape is facing the cleaning fluid application arrangement of the cleaner cartridge to moisten a length of the current cleaning section with a cleaning fluid from the first end to the second end;
    transporting the current cleaning section of the cleaning tape moistened with the cleaning fluid along a head of a tape drive to clean read/write elements of the head using the length of the current cleaning section during a cleaning cycle of the wet cleaning operation;
    receiving an input to perform the wet cleaning operation;
    mounting a scratch tape into the tape drive;
    performing a first performance test on the read/write elements of the head of the tape drive using the scratch tape;
    generating a first tape drive dump file based on results of the first performance test; and
    unmounting the scratch tape from the tape drive.

3. The method of claim 2 further comprising:
    mounting the cleaner cartridge into the tape drive;
    reading a current cleaning count and current motor taches count stored in a cartridge memory of the cleaner cartridge;
    determining whether the current cleaning count of the cleaner cartridge is equal to a predefined maximum cleaning count;
    responsive to determining that the current cleaning count of the cleaner cartridge is less than the predefined maximum cleaning count, positioning an end of the current cleaning section of the cleaning tape at a fluid roller included in the cleaner cartridge based on the current cleaning count;
    increasing tension on the cleaning tape using a motor of the tape drive to move the fluid roller from a first position to a second position that allows flow of the cleaning fluid from a tank of the cleaner cartridge onto the current cleaning section of the cleaning tape; and moving the cleaning tape from the end to a beginning of the current cleaning section using the motor of the tape drive to moisten a predefined length of the current cleaning section with the cleaning fluid via the fluid roller.

4. The method of claim 3 further comprising:

decreasing the tension on the cleaning tape using the motor of the tape drive to move the fluid roller from the second position to the first position that stops the flow of the cleaning fluid from the tank of the cleaner cartridge onto the current cleaning section of the cleaning tape; and positioning the beginning of the current cleaning section moistened with the cleaning fluid at the read/write elements of the head of the tape drive based on the current motor taches count.

5. The method of claim 4 further comprising:

selecting a wet cleaning movement algorithm from a plurality of wet cleaning movement algorithms stored in firmware of the tape drive based on a type of contamination of the read/write elements of the head; and moving the predefined length of the current cleaning section moistened with cleaning fluid and the read/write elements of the head in accordance with the selected wet cleaning movement algorithm to remove the type of contamination from the read/write elements.

6. The method of claim 5 further comprising:

determining whether a current cleaning cycle of the selected wet cleaning movement algorithm has ended;

responsive to determining that the current cleaning cycle of the selected wet cleaning movement algorithm has ended, updating the cartridge memory of the cleaner cartridge by incrementing the current cleaning count by one and the current motor taches count by six hundred twenty-five; and unmounting the cleaner cartridge from the tape drive.

7. The method of claim 6 further comprising:

mounting the scratch tape into the tape drive;

performing a second performance test on the read/write elements of the head of the tape drive using the scratch tape;

generating a second tape drive dump file based on results of the second performance test; and unmounting the scratch tape from the tape drive.

8. The method of claim 7 further comprising:

comparing the first tape drive dump file with the second tape drive dump file to determine whether further wet cleaning is needed based on comparison of tape drive dump files.

* * * * *